United States Patent [19]

LaFlame

[11] 4,453,442

[45] Jun. 12, 1984

[54] CARRIER FOR A PERCUSSION INSTRUMENT

[76] Inventor: Thomas R. LaFlame, 107 Noble Ave., Pittsburgh, Pa. 15205

[21] Appl. No.: 385,292

[22] Filed: Jun. 4, 1982

[51] Int. Cl.[3] .................... G01G 5/00

[52] U.S. Cl. .................... 84/421; 224/910

[58] Field of Search .................... 84/411, 418–421; 224/910, 262, 270

[56] References Cited

U.S. PATENT DOCUMENTS

| | | | |
|---|---|---|---|
| 3,974,732 | 8/1976 | Kester | 84/421 |
| 4,256,007 | 3/1981 | Streit | 84/421 |
| 4,387,839 | 6/1983 | Dranchak | 84/421 X |
| 4,402,441 | 9/1983 | Jones et al. | 224/910 X |

*Primary Examiner*—Donald A. Griffin

*Attorney, Agent, or Firm*—Thomas H. Murray; Clifford A. Poff

[57] ABSTRACT

A carrier for a percussion instrument includes a belly plate with an instrument carrier extending outwardly therefrom to supply an instrument in an overhanging position from a person. A rigid band extends along one or both sides of the person at the waistline area from the belly plate to the back of the person. In one embodiment, a back-plate riser arm angles upwardly to traverse the spine of a person at an angle at the thoracic region generally below the scapula region. In a second embodiment, the same area of a person's back is traversed by a back-plate riser arm extending from a back section of the rigid band. A pad assembly is adjustably positioned on the riser arms to engage the person's back.

10 Claims, 4 Drawing Figures

CARRIER FOR A PERCUSSION INSTRUMENT

BACKGROUND OF THE INVENTION

This invention relates to a carrier for an instrument, particularly a percussion instrument such as drums or the like. More particularly, the present invention relates to such a carrier embodying a construction and relationship of parts to transfer forces due to, inter alia, the weight of the instrument to the body of a person in a manner so that the person can efficiently carry the instrument; maintain a stable attitude while walking or marching about and avoid pressure or other forms of detrimental forces on the shoulders and lower back, lumbar region.

As is known in the art, a carrier for a percussion instrument generally takes the form of a frame-like structure that is suspended from the shoulders of a person by hooks or straps. The hooks engage with a T-shaped breastplate with a central leg extending to a riser attached to a belly plate. A carrier frame projects from the belly plate and any one of various forms of extension bars may be attached to the carrier frame for engaging the instrument or instruments. It is a common practice to use such a carrier to support one or more of a variety of instruments that notably consist of one or more drums. The instrument may comprise marching bells, a xylophone, a vibraphone, a marimba, a timpani, chimes or the like. An example of such a carrier is disclosed in U.S. Pat. No. 3,106,123.

Instead of hook members to engage the shoulders, a shoulder harness made up of straps that pass over the shoulders of a person, crossing in the back and passing forwardly below the arms at the sides of the person, can be used to support a drum which is also connected to a belly plate by other straps. Examples of this type of carrier are shown in U.S. Pat. Nos. 3,021,744 and 3,974,732. Another form of an instrument carrier is shown in U.S. Pat. No. 4,256,007 and comprises a rigid metal rod with bent portions forming a pair of spaced-apart loops for engaging the shoulder blades of a marcher and a cooperating integral bent portion adapted to contact the back of the marcher to suspend the carrier from the player's torso. A pair of arm members projects from the frame at the back of a person forwardly to support the percussion instrument. A releasable belt is coupled between the opposite sides of the frame to secure the carrier to the marcher.

Because of the fact that percussion instruments must be carried at an outwardly-extended position from the marcher's body, the shoulders and the lower back of the person carrying the instrument are particularly vulnerable to fatigue. The stress and strain due to the overhung load can be detrimental to the person carrying the instrument. In recent times, the number, weight and types of instruments that are carried have increased. For example, four and sometimes six drums are carried by an individual. Other instruments which are supported by carriers which hang on the marcher's body include bells, a xylophone or a marimba, vibraphone, timpani and/or chimes which may have a weight of up to and sometimes exceeding 30 pounds. Sometimes an instrument or a group of instruments weighing up to 70 pounds must be carried. The weight of an instrument is applied to a marcher as a torque about the belly plate and forms a moment arm defined by shoulder straps or hooks. The marcher, almost inherently, shifts his or her lower torso forwardly as an offsetting measure to sustain the load produced by the overhanging weight. This causes fatigue in the lower lumbar region which the carrier of the present invention is designed to at least substantially eliminate.

SUMMARY OF THE INVENTION

It is an object of the present invention to provide a carrier for use by a person to carry a percussion or the like instrument in which reactive forces to the weight of an instrument carried in an outwardly-overhung manner from the person are applied to the back thoracic region of the person about a pivot area normally contacted by a belly plate situated at a front waistline region of the person.

More particularly, according to the present invention a carrier is provided for use by a person to carry a percussion instrument or the like wherein the carrier includes the combination of means with a carrier bracket extending outwardly therefrom for supporting an instrument at an outwardly-overhung position about a fulcrum area of contact with the front waistline area of the person, a rigid band with a generally bent contour to extend along a portion of the waistline area of the person to the back of the person, a back-plate riser arm supported by the ban to extend in a generally upward direction such that a portion of the arm will extend along the back thoracic region of the person, and means carried by the arm for imparting to the thoracic back region of the person a reactive force to the overhung weight of the instrument about the aforesaid means forming a fulcrum area of contact with the person. The aforesaid means with a carrier bracket preferably includes a belly plate with a curved contour to conform to the contour of the front waistline area of the person.

In one embodiment of the carrier of the present invention, the aforesaid back-plate riser arm angles upwardly from the side of the person to diagonally cross the spinal column at the thoracic region. In another embodiment of the present invention, the rigid band includes a back portion with at least one but peferably two bent side portions having terminal ends joined to a belly plate. The back-plate riser arm extends perpendicularly to the back portion in a generally parallel relation with the spinal column and traverses the thoracic region of a person. A rectangular or square pad having a resilient surface is adjustably attached to the back-plate riser arm and forms the aforesaid means carried by the arm for imparting the reactive force to the thoracic back region. The pad is preferably situated to engage the thoracic back region below the scapula back region.

These features and advantages of the present invention as well as others will be more fully understood when the following description of two embodiments of the present invention is read in light of the accompanying drawings, in which.

Figure 1:
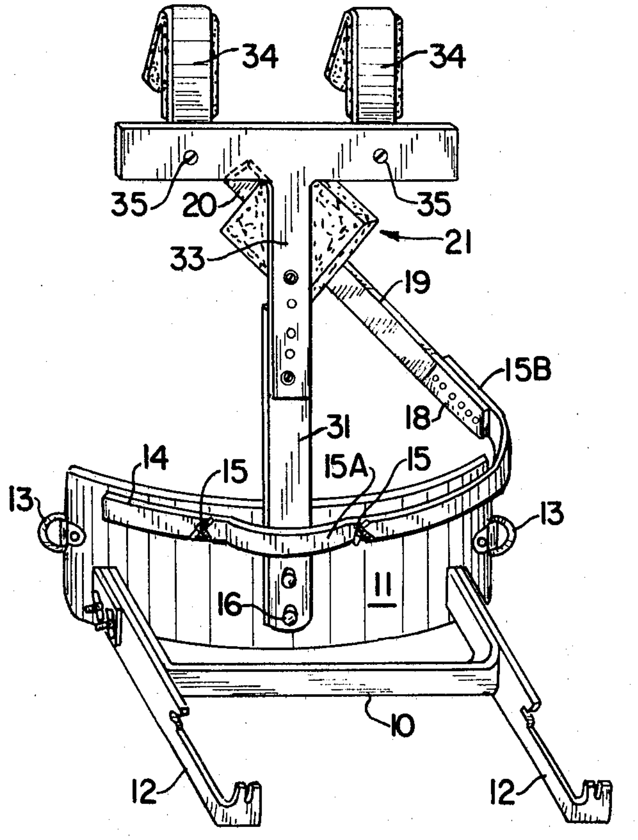
FIG. 1 is an isometric view of a carrier according to one embodiment of the present invention.

Turning, first, to FIG. 1 there is illustrated a carrier for an instrument, although any one of a number of different instruments may be engaged for support on the carrier by the use of suitably-constructed extension arms. Such other instruments include marching bells, a marching xylophone a marching marimba and the like. More than one drum may be supported by the use of the carrier according to the present invention. The carrier in FIG. 1 includes a carrier frame 10 having the form of a U-shaped bent bar with the free ends of leg portions welded or otherwise attached to a belly plate 11. The carrier frame 10 is engaged with extension arms 12 which project from the belly plate along the leg portions of the carrier frame 10 outwardly where they engage and support the instruments, such as a marching xylophone, not shown. The belly plate 11 has a curved configuration to generally conform to the front waistline contour of a person. Fastening rings 13 are bolted to opposite lateral sides of plate 11. A waist plate 14 is affixed by fasteners 15 across the top portion of the belly plate. Vertically spaced-apart attachment pins 16 extend from the belly plate at the center portion thereof. The waist plate takes the form of a rigid band with a curved portion 15A protruding outwardly from the belly plate for access to the attachment pins 16, the purpose of which will be explained in detail hereinafter. The inner face of the curved configuration of the belly plate which is opposite the face engaged with carrier frame 10, has a resilient comfort pad to cushion and distribute supporting engagement at the wasteline area with a marcher. The configuration of the belly plate can be changed as necessary. If desired, a portion of the waist plate 14 can serve as a means for supporting an instrument at the front waistline area of a person. The waist plate 14 has a bent side section 15B with at least one but preferably two drilled openings therein that can be aligned with spaced-apart drilled openings in a lower end portion 18 of a back riser arm. Fasteners, such as nut and bolt assemblies, releasably interconnect the riser arm to the waist plate so that the riser arm is spaced from the belly plate by a distance which is sufficient to accommodate the size of the waistline area of a person. The riser arm angles upwardly to present an end portion 20 generally diagonally with the spinal column of the person at the thoracic region. A back-plate assembly 21 is adjustably positioned on end portion 20 to present a load-bearing face of the plate at the thoracic back region generally below the scapula back region of the person.

Figure 3:
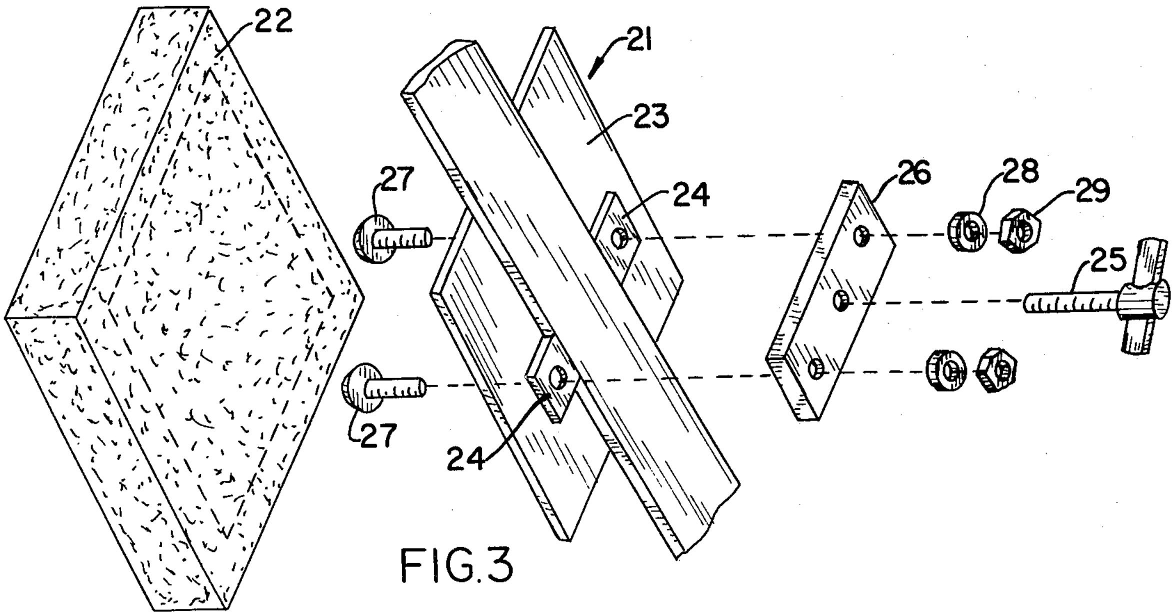
FIG. 3 is an exploded view illustrating the details of an adjustably-positioned back plate forming part of the carrier of the present invention.

As shown in FIG. 3, the back-plate assembly 21 includes a rectangularly-shaped resilient pad 22 having one face surface affixed by a suitable adhesive to a plate 23. The opposite face surface of plate 23 engages slide blocks 24 which are spaced apart by a distance corresponding to the width of the back-riser plate so that it can fit between the blocks where it is releasably clamped to the plate 23 by a clamp screw 25 passed through a threaded opening in a crossplate 26. Drilled openings in the crossplate 26, side blocks 24 and back plate 23 are aligned to receive bolts 27 that are secured in place by washers 28 and nuts 29 at the crossplate. The slide blocks form spacers to hold the crossplate from the back-riser plate so that only the threaded end portion of the fastener 25 can engage the back plate when passed through the crossplate.

Referring, again, to FIG. 1 the pins 16 engage with openings in a lower end portion of a front riser arm 31. The upper end of the riser arm has a series of drilled holes to receive threaded fasteners when aligned with drilled holes in the shank of a T-shaped breastplate 33. Oppositely-extending wing portions of the breastplate carry shoulder hooks 34 which are attached by threaded fasteners 35. The shoulder hooks 34 pass over the shoulder of a person to maintain the belly plate and waist plate at an elevation corresponding to the front waistline area. The weight of the instrument carried on arms 12 acts, about a fulcrum formed by the belly plate, to produce a reactive force on the resilient face of the back-plate assembly 21 against the thoracic region generally just below the scapula, i.e., just below the lower parts of the shoulder blades.

Figure 2:
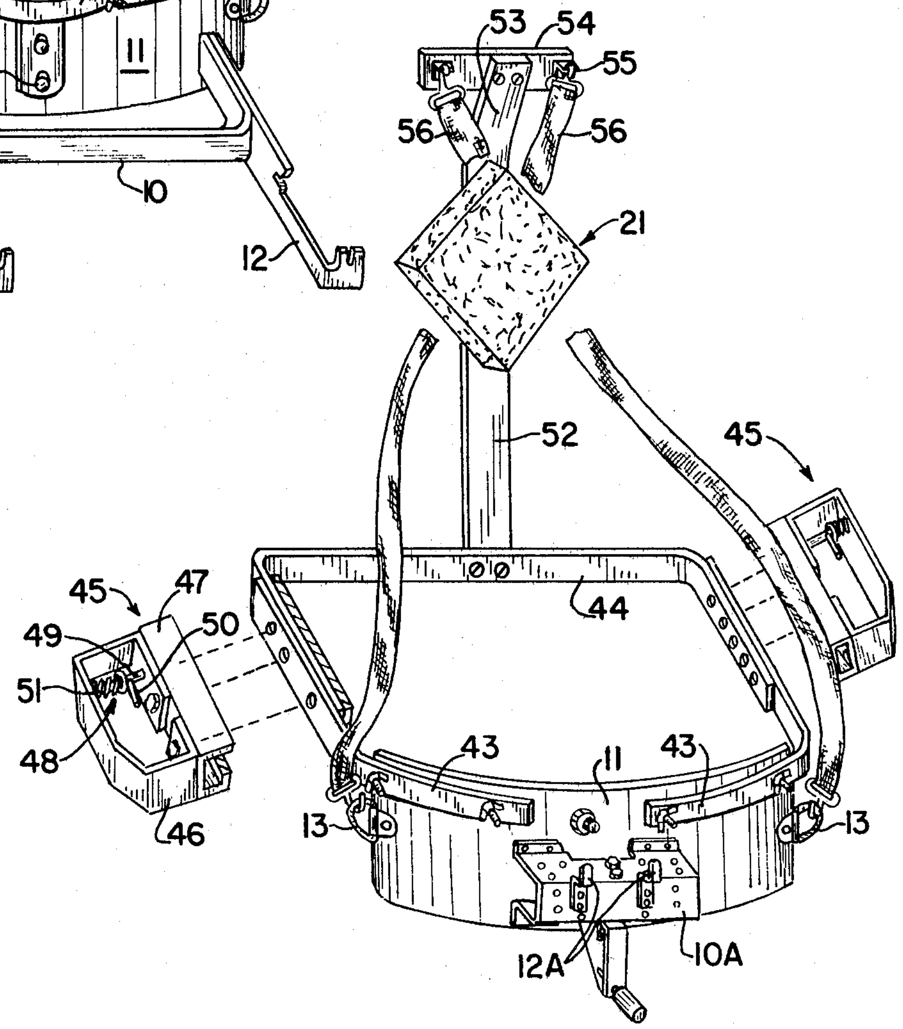
FIG. 2 is an isometric view of a carrier according to a second embodiment of the present invention.

In FIG. 2, a further embodiment of the present invention is illustrated and includes a belly plate which is substantially the same as belly plate 11 already described in regard to FIG. 1. Reference numeral 11 identifies the belly plate to which a carrier frame assembly 10A is attached by rivets or other fasteners. The carrier frame assembly carries hooks 12A to engage and support a snare drum. The embodiment of FIG. 2 includes a waist-plate assembly that passes along at least one side part but preferably encircles the waistline area at the sides and back of a person. The waist-plate assembly includes side portions 43 which are attached at end portions to the belly plate with their opposite ends bent to extend along the opposite sides of a marcher. The side portions 43 are joined with leg portions of a U-shaped back plate 44. Releasable latch assemblies 45 are used to hold the back plate to the side portions 43 at a preselected spacing from the belly plate. Each latch assembly includes a frame 46 engaged with a length of square tubing 47 into which side portions 43 extend and are secured thereto. A leg portion of back plate 44 can slide into the tubing. Frame 46, in turn, supports a spring-biased lock pin assembly 48 having a lock pin 49 with an end portion that can pass through aligned openings in waist-plate portions 43 and 44. Assembly 48 includes an actuator arm 50 projecting from the lock pin so that the fingers of the person can apply a squeezing force to compress a spring 51 and withdraw the pin 49 from the aligned openings in waist-plate portions 43 and 44. The latch assembly has no loose parts and permits quick disengagement of the waist-plate portions.

A back riser arm 52 extends from the midportion of waist plate 44 in a generally perpendicular relationship such that the riser arm projects upwardly along a site which is generally parallel with the spinal column of the person traversing the thoracic region. Back-plate assembly 21 embodies the same construction of parts as already described in regard to FIGS. 1 and 3 for adjustable support on the back riser arm and positioning at the thoracic region. End portion 53 of the back riser arm is curved forwardly and terminates generally at the upper part of the thoracic region, preferably before the cervical region of the person's spine. End portion 53 is engaged by threaded fasteners to support a crossbar 54 which carries spaced-apart eyelets 55 used to engage with hook members on the ends of straps 56. The straps pass forwardly over the shoulders of the marcher where they cross at the chest area and passed downwardly to engage with fastening rings 13.

Figure 4:
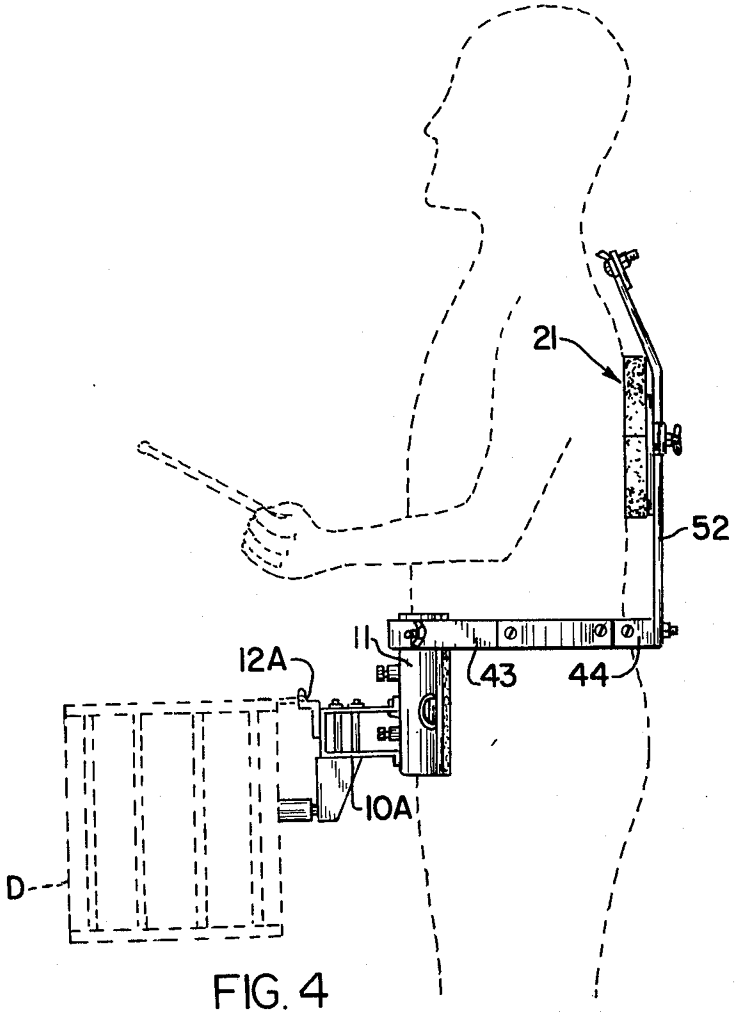
FIG. 4 is a left-side elevational view illustrating the upper torso of a person while supporting a carrier according to the embodiment of the present invention shown in FIG. 2.

In FIG. 4 of the drawings, the manner by which the carrier according to the present invention is supported by a person is illustrated with respect to the embodiment of FIG. 2. It can be seen that the belly plate 11 forms a fulcrum area by contact with the waistline area and upper belly region for the weight of an instrument, e.g., snare drum D which is carried at an outwardly-hanging relation by carrier assembly 12A. The downward force produced by the weight of the instrument is applied by a reactive force to the thoracic region of the person by back-plate assembly 21. The reactive force is transmitted by the waist-plate portions 43 and 44 and riser arm 52. The hooks 34 in the embodiment of FIG. 1 and straps 56 in the embodiment of FIG. 2 maintain the carrier so that the waist-plate portions extend along the general waistline area of the person and prevent downward movement of the carrier on the upper torso of the person.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A carrier for use by a person to carry a percussion or the like instrument, said carrier including the combination of:

plate means with a carrier extending outwardly therefrom for supporting an instrument at an outwardly-overhung position from a person, a rigid band with a generally bent contour to extend along at least a portion of the waistline area of the person from said means to the back of the person, a back-plate riser arm supported by said band to extend in a generally upward direction therefrom such that a portion of the arm will extend along the back thoracic region of the person, and pad means carried by said arm for imparting to the thoracic back region of the person a reactive force to the overhung weight of said instrument about a fulcrum area defined by a contact area of the plate means with the person.

2. The carrier according to claim 1 wherein the bent contour of said band is defined by a generally U-shaped member with a back part joined with side parts extending along the waistline area at the sides and along the back side of a person, and side parts extending to terminal end portions attached to said plate means.

3. The carrier according to claim 1 or 2 wherein said band includes frontal and back parts joined together by a releasable latch.

4. The carrier according to claim 3 wherein said releasable latch includes a spring-biased pin member to interconnect frontal and back parts of said band.

5. The carrier according to claim 1 wherein said back-plate riser arm angles upwardly to prevent an end portion generally diagonally with the spinal column at the thoracic region of a person.

6. The carrier according to claim 1 wherein said back-plate riser arm projects upwardly in a generally parallel relation with the spinal column of a person to traverse the thoracic region.

7. The carrier according to claim 1 further including means engageable with the shoulders of a person for positioning said plate means and said band at the waistline area of a person.

8. The carrier according to claim 7 wherein said pad means further includes means for adjustably retaining said back plate member on said back-plate riser arm.

9. The carrier according to claim 1 wherein said pad means includes a back plate member carrying a resilient support pad for distributing said reactive force to the thoracic back region and generally below the scapula back region of a person.

10. The carrier according to claim 1 wherein said plate means includes a belly plate.

* * * * *